United States Patent [19]

Nishiyama

[11] Patent Number: 5,040,129

[45] Date of Patent: Aug. 13, 1991

[54] DATA PROCESSOR FOR GENERATING CHARACTER IMAGE

[75] Inventor: Masaaki Nishiyama, Toyohashi, Japan

[73] Assignee: Minolta Camera Kabushiki, Osaka, Japan

[21] Appl. No.: 490,141

[22] Filed: Mar. 7, 1990

Related U.S. Application Data

[63] Continuation of Ser. No. 80,449, Jul. 31, 1989, abandoned.

[30] Foreign Application Priority Data

Aug. 5, 1988 [JP] Japan ................................ 61-184503

[51] Int. Cl.[5] ................................ G06F 15/62

[52] U.S. Cl. ................................ 364/519; 340/799

[58] Field of Search ................ 364/518, 514; 340/724, 340/799, 803

[56] References Cited

U.S. PATENT DOCUMENTS 3,973,245 8/1976 Belser ................ 340/799 X
4,115,765 9/1978 Hartke ................ 340/324
4,419,740 12/1983 Hevenor, Jr. ................ 364/900
4,703,438 10/1987 Nishiyama et al. ................ 364/519
4,736,200 4/1988 Ounuma ................ 340/803 X
4,745,407 5/1988 Costello ................ 340/799
4,797,809 1/1989 Sato et al. ................ 340/724 X
4,825,386 4/1989 Bogacki ................ 364/518
4,868,557 9/1989 Perlman ................ 340/799

FOREIGN PATENT DOCUMENTS 3310091 9/1983 Fed. Rep. of Germany .
61-113087 5/1986 Japan .

*Primary Examiner*—Gary V. Harkcom
*Assistant Examiner*—Mark K. Zimmerman
*Attorney, Agent, or Firm*—Price, Gess & Ubell

[57] ABSTRACT

A data processor for generating character images in a bit map memory according to character code data obtained from an external host computer. The data processor transforms the orthogonal positional data of the character code data into linear addresses for use in a linear address space where the linear address space has an origin corresponding to the origin of said orthogonal coordinate.

11 Claims, 5 Drawing Sheets

*Fig. 3*
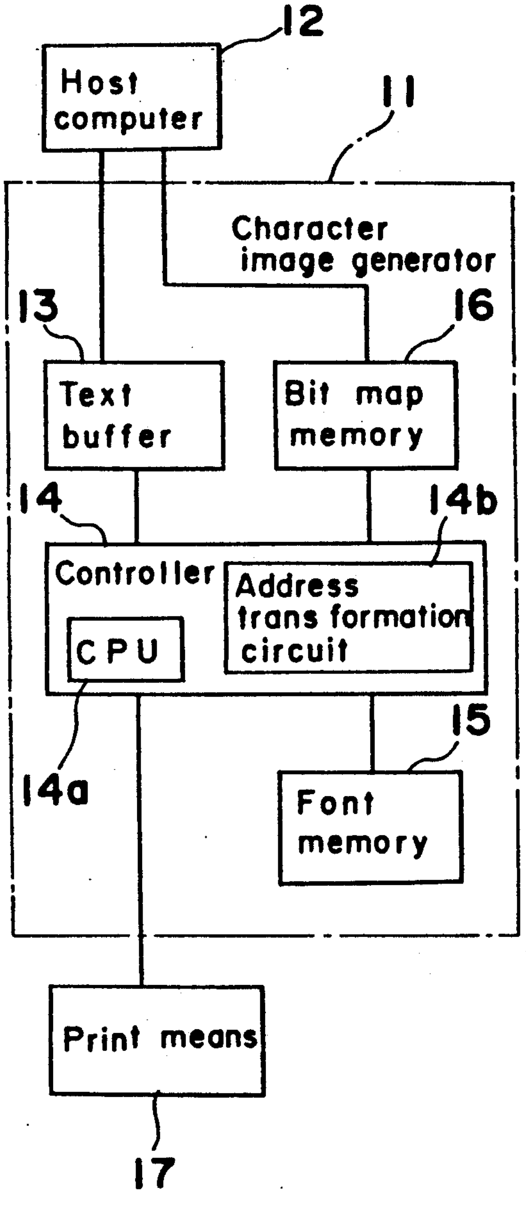
*Fig. 6(a)*
*Memory for horizontal letter size*
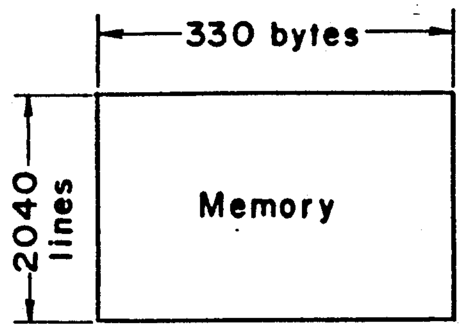
*Fig. 6(b)*
*Memory for vertical letter size*
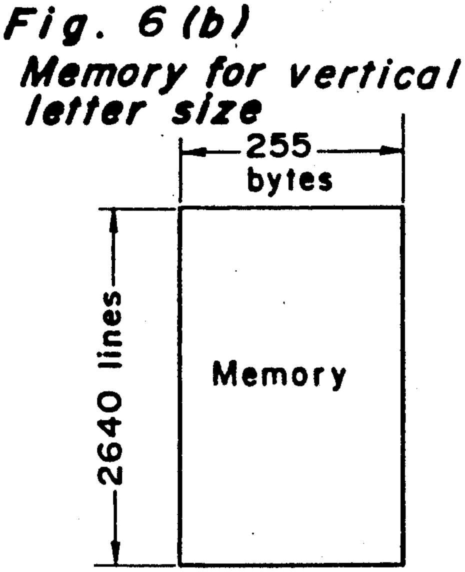
*Fig. 6(c) Memory for both of horizontal and vertical letter sizes*
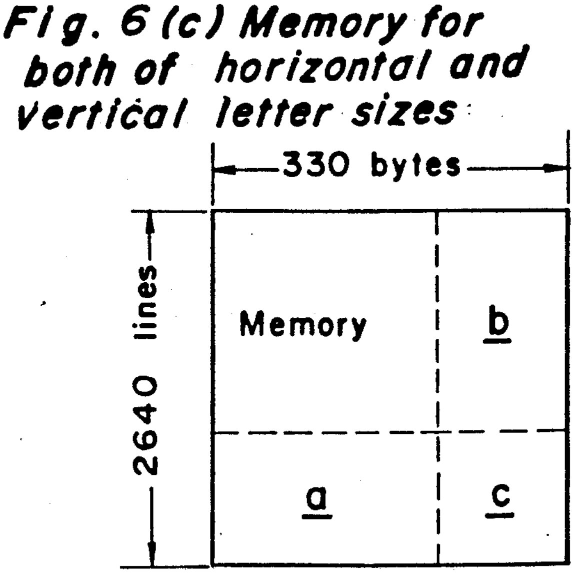

*Fig. 7 (a) Horizontal*
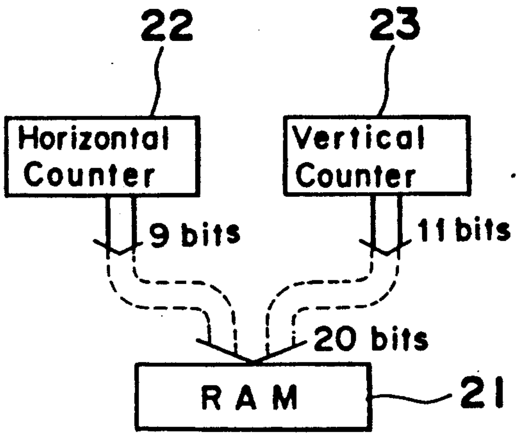
*Fig. 8*
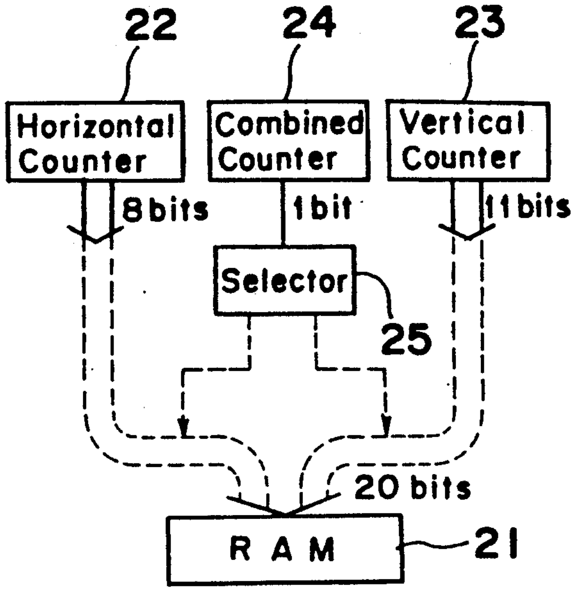
*Fig. 7 (b) Vertical*
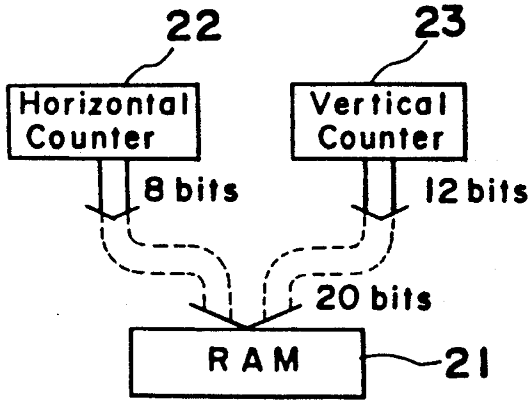
*Fig. 7 (c) Horizontal and Vertical*
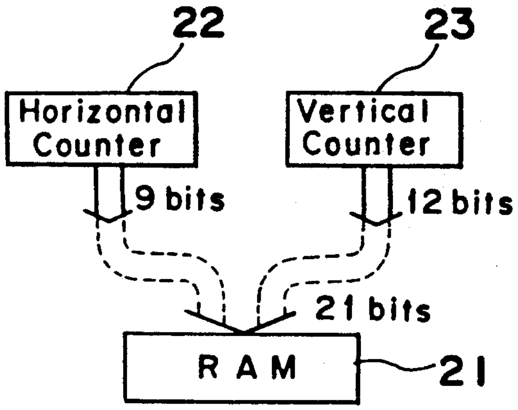

DATA PROCESSOR FOR GENERATING CHARACTER IMAGE

This is a continuation of application Ser. No. 080,449, filed on July 31, 1987, for a DATA PROCESSOR FOR GENERATING CHARACTER IMAGE, now abandoned.

BACKGROUND OF THE INVENTION

1. Field of the Invention

The present invention relates to a data processor for generating character images, especially to an address transformation system in a character image generator of bit map type.

2. Description of the Prior Art

In a laser printer which provides a laser optical system and an electro-photographic system, there is usually used a so called bit map system as a character image generating system. In the bit map system, there is provided a bit map memory having a memory area for storing all image data contained in one page to be printed. Image data sent from an external data processor are stored as bit images temporarily in the bit map memory. If image data sent from the external data processor are character codes, individual character bit images are formed in the bit map memory by reading them from a font memory corresponding to character codes sent. This bit map system has advantages in that fine control with respect to a print format regarding print positions of images and an orientation of print is possible and images other than character images can be formed, although a bit map memory of a large volume and of a high cost is needed therefor.

Conventionally, a manner for accessing data by the bit map memory is determined according to a size of a print paper and a print resolution chosen.

For example, in a case wherein print is made on a print paper of letter size at a resolution of 240 dpi (dots per inch), the length-wise direction of which is put so as to orient the horizontal direction as is shown in FIG. 6(*a*) (hereinafter referred to "horizontally put paper"), there is used a memory having a memory area of 330 bytes (horizontal) * 2040 lines (vertical). Accordingly, as shown in FIG. 7(*a*), in order to access this memory, a horizontal counter 22 of 9 bits and a vertical counter of 11 bits are needed and, therefore, twenty address signal lines become necessary.

Similarly, in a case wherein print is made on the print paper laid normally in a vertical direction at a resolution of 240 dpi (hereinafter referred to "vertically put paper"), as is shown in FIG. 6(*b*), a memory having a memory area of 255 bytes (horizontal) * 2640 lines (vertical) is used. Accordingly, as shown in FIG. 7(*b*), a horizontal counter 22 of 8 bits and a vertical counter 23 of 12 bits are needed for accessing the memory, and therefore, twenty address signal lines become necessary.

If one wishes to provide a memory being available for both papers put horizontally and vertically, it should have a memory area of 330 bytes (horizontal) * 2640 lines (vertical) as shown in FIG. 6(*c*). Accordingly, as shown in FIG. 7(*c*), a horizontal counter 22 of 9 bits and a vertical counter 23 of 12 bits become necessary in order to access said memory, and therefore, twenty-one ($21=9+12$) address signal lines become necessary. In other words, the number of address signal lines in this case becomes more than that of either memories by one which are provided independently for respective papers put horizontally and vertically.

Roughly speaking, this difference by one address signal line means that the capacity of the latter case becomes almost twice that of the former case although, as shown in FIG. 6(*c*), areas a and c are not necessary in the case of the paper put vertically and areas b and c are not necessary in the case of the paper put horizontally.

One possible method to solve this problem is to provide one more counter of one bit as indicated by a reference numeral 24 in FIG. 8 which serves as a counter for the lower most bit of the horizontal counter in the case of the paper put horizontally and as a counter for the upper most bit of the vertical counter in the case of the paper put vertically. This counter 24 can be switched from the horizontal counter 22 to the vertical counter 23 or vice versa by a selector 25. This enables access to both memories with twenty address signal lines without increasing the capacities of memories.

This method is effective for handling both sizes of papers put vertically and horizontally.

However, when considering a system available to a variety of sizes of papers put horizontally and vertically and/or being able to switch the resolution from 240 dpi to 480 dpi, said method is not so effective because it is not flexible to an extention of the memory 21, complex structures of the selector 25 and horizontal and vertical counters 22 and 23 are required and, further, the memory 21, when extended, would contain a useless memory area.

SUMMARY OF THE INVENTION

An essential object of the present invention is to provide a data processor for a character image generator being able to correspond to a variety of paper sizes with a minimum increase of memory area of a bit map memory.

In order to accomplish the object, according to the present invention, there is provided a data processor for generating character images which receives character data transmitted from an external data processor which include at least character codes and position data of individual characters being represented with use of an orthogonal coordinate and forms bit images of individual character data in a bit map memory based on character data received, being characterized by:

address transformation means for transforming said position data of individual characters into linear address data being defined in a linear address space which has an origin corresponding to the origin of said orthogonal coordinate; and means for forming bit images of individual characters on the bit map memory based on said linear address data obtained by said address transformation means.

BRIEF DESCRIPTION OF THE DRAWINGS

These and other objects and features of the present invention will be more apparent when the preferred embodiment of the present invention is described in detail with reference to the accompanying drawings wherein, FIG. 3 is a block diagram of a character image generator according to the present invention, FIG. 8 shows another composition of counters considered instead of the composition shown in FIG. 7(*c*).

DESCRIPTION OF THE PREFERRED EMBODIMENT

<a> Linear address space

An essential reason why it is difficult in a conventional system to correspond to a variety of paper sizes and a high resolution is that a horizontal counter and a vertical counter are provided and treated independently of each other.

Contrary to this, the present invention is characterized in that a general idea about separate horizontal and vertical counters is taken away. In other words, according to the present invention, there is introduced a linear address space instead of a two dimensional orthogonal coordinate wherein an address is identified by values of X, Y coordinates.

Figure 1:
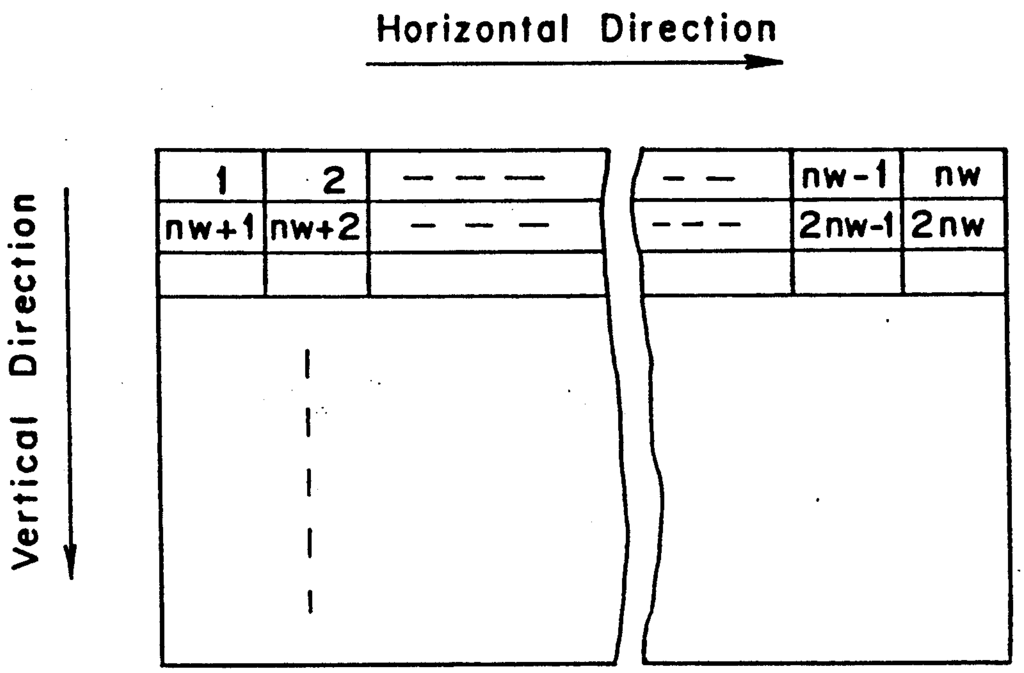
FIG. 1 is an explanatory plan view for showing a linear address space according to the present invention.

Namely, according to the present invention, respective addresses in a bit map memory are defined in a linear address space as shown in FIG. 1. Memory areas in the bit map memory are defined in units of a word (16 bits) along every scan line (horizontal line) and addressed in ascending order from the left-most end to the right-most end. Accordingly, the next address of the last address of a scan line is the first address of the next scan line. This relation about addresses is kept unchanged. This means that, if the paper size is changed to a large one or the resolution is changed to a higher one, an additional linear address space can only be added to the present linear address space.

For instance, assume that a bit map memory is provided corresponding to a letter size paper. In this case, the memory has a capacity of 673200 bytes in order for papers put horizontally and vertically. In the case of a paper of letter size put horizontally, the total number nw of bytes of each scan line is 330 and the total number of lines in the vertical direction is 2040 and, therefore, the total number of bytes of the memory is equal to 673200 (=330 * 2040).

In the case of a paper of letter size put vertically, the total number nw of bytes of each scan line is 255 and the total number of lines in the vertical direction is 2640 and, accordingly, the total number of bytes of the memory is also 673200 (=255 * 2640). Therefore, all memory areas in the bit map memory are addressed from 1st to 673200-th.

Next, let us assume that the resolution is switched to a higher one (480 dpi) from 240 dpi.

In this case, the capacity of the memory has to be increased to four times that of 240 dpi; (horizontal format) (330 * 2) * (2040 * 2)=2692800 (vertical format) (255 * 2) * (2640 * 2)=2692800. Since the memory area from 1st to 673200-th can be used as it is, a memory defined from 673201-st to 2692800-th addresses only need be added thereto.

Next, addresses for imaging onto the bit map memory will be explained.

Figure 2:
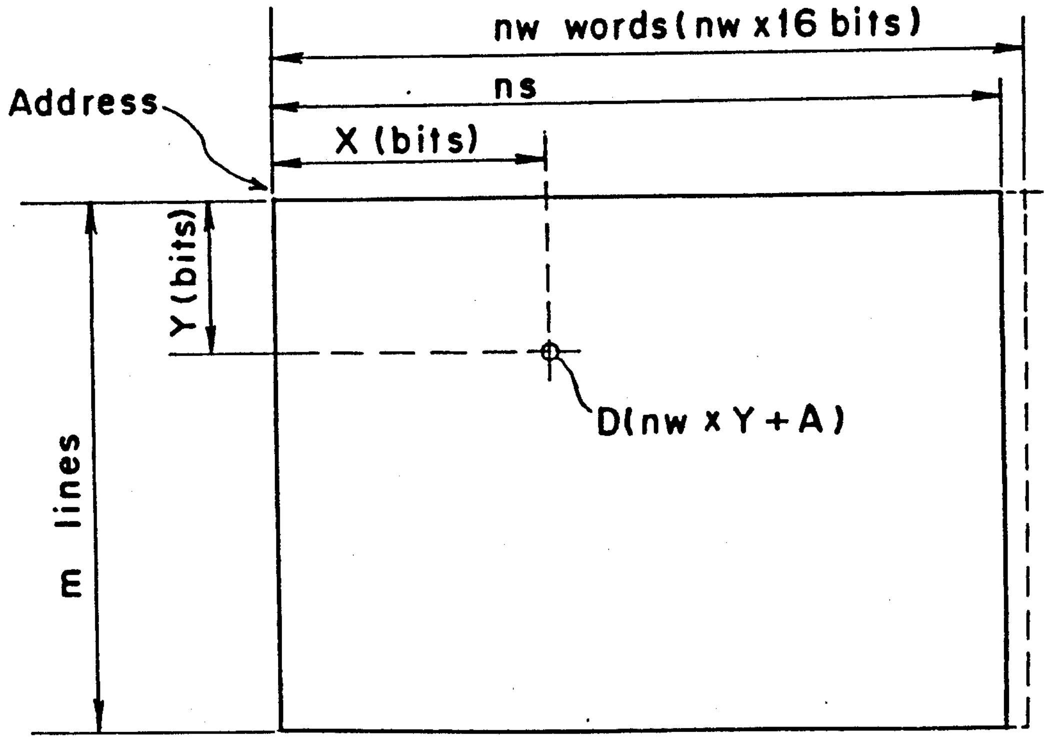
FIG. 2 is an explanatory view showing a relation between an orthogonal coordinate and a linear address corresponding thereto.

As shown in FIG. 2, assume that the bit map memory has a memory area defined by nw words ( =nw * 16 bits) (horizontal) * m lines (vertical). The term "word" is a fundamental units for data processing by a computer, as is well known to those skilled in the art. In this preferred embodiment one word is comprised of 16 bits. Values of nw and m are determined based on an image area to be set. In other words, they are determined when a size of paper and a resolution are designated for printing. For example, if the paper size and the resolution are designated to "A3" (297 mm * 420 mm) and 480 dpi, respectively, nw and m are determined as follows;

$$nw \text{ (words)} = \frac{297}{25.4} * 480 * \frac{1}{16} = 351$$

$$m \text{ (bits)} = \frac{420}{25.4} * 480 = 7938$$

Since individual bit images are processed in unit of a byte in the horizontal direction, a total number ns of dots in the horizontal direction of each line is equal to or smaller than nw * 16, namely, ns≦nw * 16.

The host data processor which transmits image data designates a position D of an image (character) by values of X, Y coordinates. Herein, X and Y are counted in units of a bit. The address transformation circuit according to the present invention transforms the coordinate (X, Y) into a linear address in the linear address space. The linear address corresponding to the position D is represented in units of a word as follows:

nw * Y+A wherein A=(X-B)/16 which is an address in units of a word obtained by transforming X bits and B is a residual number of bits obtained when divided. In other words, A is equal to the integer portion of X/16. For example, if X were 12, A would equal 0 and if X were 17, A would equal 1.

For example, let us consider a case wherein an image of a character having a width (b) of 3 words and a height (a) of 24 lines is formed in the linear address space. Image data are processed in units of word in the direction of main scan as the direction of width of a character and in unit of bit as far as in the direction of sub-scan as the direction of height thereof. Even when a character image is rotated by 90 degrees, the directions of width and height are kept unchanged to process data in units of a word in the former direction and in unit of a bit in the latter direction, respectively. In the case of B=0, addresses of the first line for the character represented by (X, Y) are varied as follows: nw * Y+A→nw * Y+A+1→nw * Y+A+2. Also, addresses of the second line are varied from {nw * (Y+1)+A+1} to {nw * (Y+1)+A+2}, addresses of each of following lines are changed in a manner similar to the above and, finally, addresses of the last line (24th line) are varied from {nw * (Y+23)+A} to {nw * (Y+23)+A+2}. As is apparent from the above, each address regarding this character is represented in a form of {nw * (Y+a)+A+b}. It is to be noted that any character data can be processed in units of words even if the rest B is not equal to zero. In such a case, the number of words assigned to the width of the character is added by one in order to handle character data as if B=0.

In the preferred embodiment according to the present invention, it is noticed that every linear address is represented by a general equation being resolved into three items as follows;

$$nw * (Y+a)+A+b = (nw * Y+A)+nw * a+b.$$

In this general equation, the first item (nw * Y+A) is a constant that is not varied during imaging a character and, therefore, it is set to a value calculated by a computer provided in a controller of the character image generator (See 14*a* in FIG. 3). The second item (nw * a) is a variable which is obtained by multiplying "nw" by "a". This multiplication is done with use of hardware after calculating nw by CPU 14*a* in FIG. 3. The third item "b" is a variable given by hardware (counter). Addition calculation from the first to third items is carried out by hardware such as adders.

In case of A3 size and resolution of 480 dpi, a number of bits necessary for the first item is equal to "22". The maximum value of nw is 351, the maximum value of Y is equal to 7938 and the maximum value of A is 351 and, therefore, the maximum value of the first item (nw * Y+A) is equal to 2786589. The number of bits necessary for the second item is 17 bits (if the maximum value of "a" is 256 and, therefore, the maximum number of (nw * a) is 89856 (=351 * 256)). The number of bits necessary for the third item "b" is 4 if it is assumed that the maximum value of "b" is 15 words. Accordingly, a number of bits necessary for an address transformation is set to 22 (the maximum of address is "2,876,460".).

(b) System of the Character Image Generator

FIG. 3 shows a composition of the character image generator 11.

Character code data outputted from the host computer 12 are stored temporarily into a text buffer 13. Individual character code data include information about a position of each character and a code for identifying each character. Information common to individual characters such as a width of character, a height of character, a paper size to be printed, a resolution and so on is transmitted to a controller 14 prior to down-load of said character code data.

The controller 14 which provides CPU 14*a* for controlling the character image generator 11 reads out data stored in the text buffer 13 and generates bit images according to data read out by consulting with a font memory 15. Those bit images generated are stored into a bit map memory 16. An address transformation circuit 14*b* provided in the controller 14 transforms respective addresses designated by X, Y coordinates into linear addresses in order to form bit images on the bit map memory 16 according to the method mentioned above. Individual graphic images are formed directly on the bit map memory 16.

Upon printing bit images, the controller 14 reads out bit images stored in the bit map memory 16 after transforming into linear addresses by the address transformation circuit 14*b* and transmits those to a print system 17 which provides a laser optical system and an electrophotographic system as is well known to those skilled in the art.

CPU 14*a* executes the following calculations based upon data transmitted from the host computer and transmits results obtained to an address transformation circuit which will be explained hereinafter in detail.

- dividing the value of X coordinate received by 16 (the bit number of one word) and setting the quotient as a value of A by cutting off the rest;
- calculating a value of nw based upon data received about the paper size and resolution of image; and
- calculating the constant item (nw * Y+A) from a value of Y coordinate received and values of nw and A having been obtained.

CPU 14*a* outputs the constant items (nw * Y+A) and nw and the variables (a) and (b) at four respective timings to, the address transformation circuit. More specifically lower 16 bits of the constant item (nw * Y+A) is outputted at a first timing, upper 8 bits of (nw * Y+A), upper (or lower) 1 bit of the constant nw and data of 4 bits representing the maximum value of (b) are outputted at a second timing, data of rest 8 bits of the constant nw are outputted at a third timing and data representing the variable (a) are outputted at a fourth timing.

Figure 5:
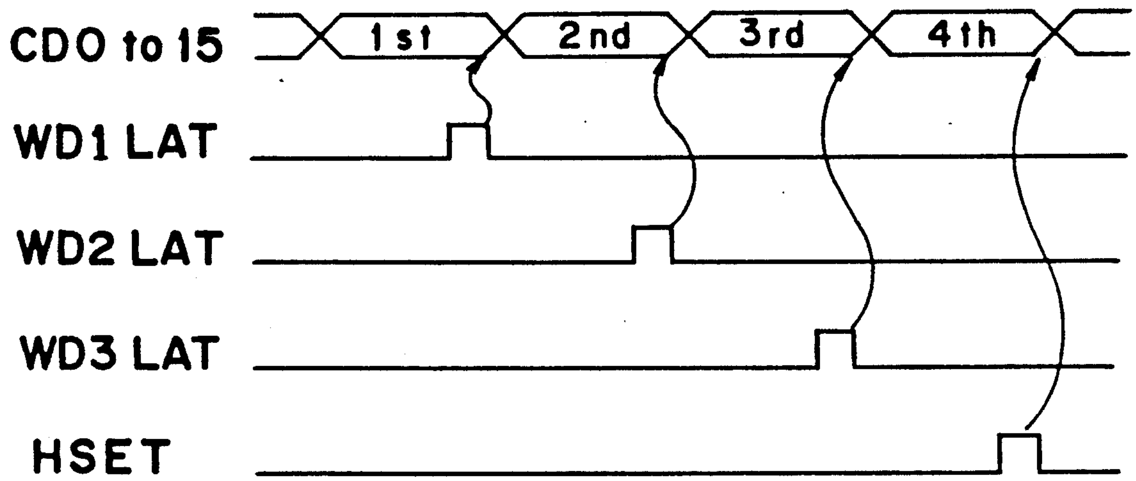
FIG. 5 is a time chart showing timings of control signals, FIGS. 6(*a*), 6(*b*) and 6(*c*) are plan views of memory areas corresponding to memories provided for letter size paper put horizontally, letter size put vertically, and letter size put both horizontally and vertically, FIGS. 7(*a*), 7(*b*) and 7(*c*) show compositions of counters for accessing respective memories shown in FIGS. 6(*a*), 6(*b*) and 6(*c*), respectively.

FIG. 5 is a timing chart showing respective timings of control signals outputted from CPU 14*a* to the address transformation circuit.

Said first to fourth outputs are latched by control signals of WD1LAT, WD2LAT, WD3LAT and HSET at respective timings.

<c> Composition of Address Transformation Circuit

Figure 4:
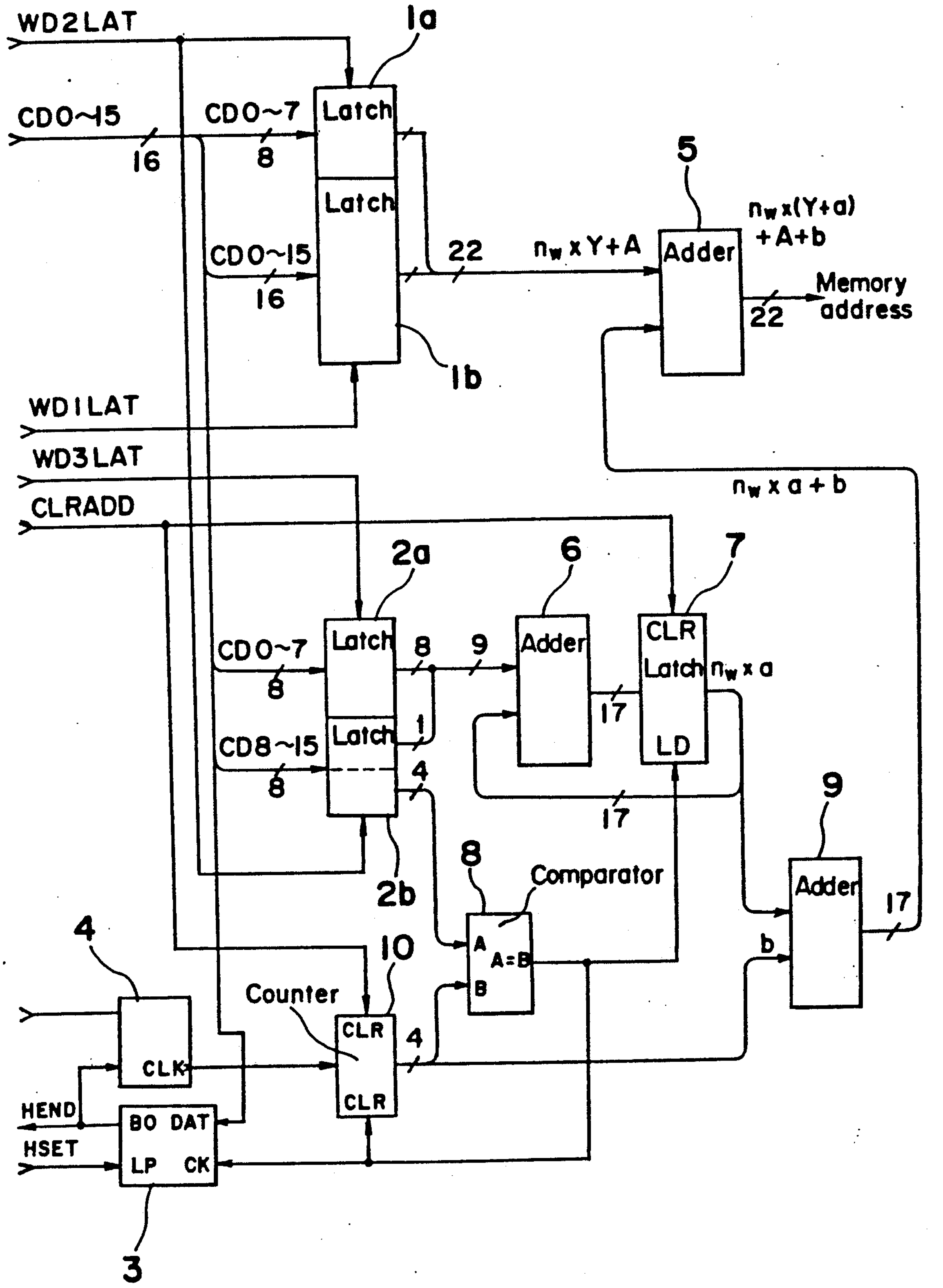
FIG. 4 is a block diagram of an address transformation circuit according to the present invention.

FIG. 4 shows a composition of the address transformation circuit.

A first latch 1*a* of 8 bits and a second latch 1*b* of 16 bits are used for memorizing the constant (nw * Y+A) of the first item in the general equation mentioned above. The value of (nw * Y+A) is outputted through data bus CD 0~15 from CPU 14*a* which is not varied during writing one character. When a WD1LAT signal is applied to the second latch 1*b*, it latches lower 16 bits of (nw * Y+A). At the next timing, the first latch 1*a* latches residual bits of (nw * Y+A), when applied WD2LAT signal thereto. Data of (nw * Y+A) of 22 bits are transmitted to one input terminal of a first adder 5. A third latch 2*a* of 8 bits and lower 4 bits of a fourth latch 2*b* of 8 bits are used for memorizing the constant nw for the second item of the general equation. Upper four bits of the fourth latch 2*b* are used for memorizing the constant of the third item which is a maximum value of (b), namely, a number of words corresponding to the width of a character. The third latch 2*a* latches data about the constant nw when WD2LAT signal is applied. The fourth latch 2*b* latches data of rest one bit about nw when WD2LAT signal is applied. At the same time, the fourth latch 2*b* latches the value of (b). If (b) indicates a width of character of 3 words, a maximum value of (b) (=2) is latched. An output signal of 9 bits comprised of data latched in the third latch 2*a* and lower 4 bits of the fourth latch 2*b* is transmitted to one input terminal of a second adder 6. Further, an output signal (b) of 4 bits from the fourth latch 2*b* is transmitted to a comparator 8. An output signal from the second adder 6 is transmitted to one input terminal of a fifth latch 7 and an output signal of the fifth latch 7 is transmitted to one input terminal of a third adder 9.

A counter 10 is provided for counting a value of (b) and outputs count values according to clock signals CLK sent from a timing generator 4.

A down counter 3 is provided for counting a number "a" of lines corresponding to the height of character and presets a value of (a) transmitted through data bus CD 0~15 when HSET signal is applied thereto from CPU 14*a*. If the height of character is "24", the value of "23" is preset as the value of "a".

The counter 10 is cleared by CLRADD signal. After that, when CLK signal is input to the counter 10 after the timing generator was started by CPU 14*a*, an output of the counter 10 is transmitted to another input terminal of the third adder 9. Said output is also transmitted to another input terminal of the comparator 8. In this comparator 8, the value of (b) being the number of words corresponding to the width of character is preset as the output signal from the fourth latch 2*b*. Accordingly, the value of the counter 10 is compared with the value of "b" therein and a signal is outputted therefrom when the former value coincides with the latter value. This signal is transmitted to LD terminal of the fifth latch 7, CLK terminal of the counter 10 and CK terminal of the down counter 11. An output from the fifth latch 7 is transmitted to another input terminal of the second adder 6.

When the signal from the comparator 8 is sent to LD terminal of the fifth latch 7 after it was cleared by CLRADD signal, an input nw from the second adder 6 is outputted by the fifth latch 7. When the next signal from the comparator 8 is input to LD terminal of the fifth latch 5, the output thereof becomes 2nw since the output of the second adder 6 becomes 2nw. Therefore, when such an operation has been repeated "a"-times, the output of the fifth latch 7 becomes (nw * a) and this signal (nw * a) is input to a third adder 9.

Meanwhile, the output of the comparator 8 is transmitted to CK terminal of the down-counter 3 and it counts down the preset value by every signal from the comparator 8. When the "a"-th signal is outputted from the comparator 8 to the down-counter 3, HEND signal is outputted from BO terminal of the down-counter 3. This HEND signal is sent to CPU 14*a* and the timing generator 4 and the latter stops to generate CLK signal thereby.

As the result of these operations, the third adder 9 can add the variable (nw * a) with the variable (b). The output thereof is transmitted to another terminal of the first adder 5. Accordingly, the first adder 5 can add the constant (nw * Y+A) with the variable (nw * a+b). The output thereof is transmitted to address terminals of the bit map memory and, thereby, the calculation operation with respect to one character is completed.

While there has been described the preferred embodiments, modifications and variations being obvious to those skilled in the art are possible without departing from the spirit of the invention. The scope is therefore to be determined solely by the appended claims.

What is claimed is:

1. A data processor for generating character images which data processor receives character data transmitted from an external data processor which character data includes at least character codes and position data, the position data of individual characters being represented with a defining orthogonal coordinate that defines a position of the individual character in an orthogonal coordinate system, and forms bit images of individual character data in a bit map memory based on the character data received, comprising:

address transformation means for transforming said position data of individual characters into linear address data being defined in a linear address space which has an origin corresponding to the origin of said orthogonal coordinate system; and means for forming bit images of individual characters on the bit map memory based on said linear address data obtained by said address transformation means.

2. A character generator according to claim 1, wherein said linear address data are addressed in units of a word being comprised of bits of a predetermined number.

3. A character image generator, comprising:

a text buffer means for temporarily storing character data received from an external source, said character data including position information;

bit map memory means for storing bit images; and a controller means for reading out character data in said text buffer means and for generating bit images according to said character data, said controller means including transformation means for transforming addresses designated by X, Y coordinates into linear addresses to form but images on said bit map memory means.

4. The character image generator according to claim 3 wherein said but map memory means describes a memory area having a width of nw words.

5. The character image generator according to claim 4 wherein said linear addresses are defined by an equation (nw x Y+A)+(nw x a)+b, wherein a is a number of lines of height of a character, b is a number of words of width of said character, and A is an integer that is representative of X when transformed into units of words.

6. A character image generator according to claim 1, in which said bit map memory has a memory area having a width nw words and a height of m lines while a character to be formed has a defining orthogonal coordinate of (X,Y) that defines the character's origin, a width of (b) words, and a height of (a) lines and said address transformation means transforms the orthogonal coordinate position data for the character into a linear address datum in word size units according to the following equation:

$$(nw * Y+A)+(nw \times a)+b$$

where A is an integer obtained by taking the integer portion of the defining orthogonal coordinate value X divided by the number of bits in a word such that the term (nw * Y+A) is a constant for the character, and wherein a varies from 0 to (a)-1 and b varies from 0 to (b)-1.

7. A character image generator according to claim 6, in which said address transformation means include first calculation means defined by a software and second and third calculation means comprised of hardware, said first calculation means calculate values of A and (nw x Y+A) and output the constants (nw x Y+A) and nw, said second calculation means calculate a value (nw x a), and said third calculation means sum up the values (nw x Y+A), (nw x a), and b.

8. A character image generator, comprising:

means for determining a number nw of words corresponding to a horizontal dimension of an image area based on a size and resolution of the image area;

a bit map memory having a logical memory space of a width of nw words and for storing bit images of characters, each character being described by a width of (b) words and a height of (a) lines; and first means for determining linear address data for each character from orthogonal coordinate data (X,Y) for each character, said linear address data to be utilized for writing said bit images into said bit map memory, said linear address data for each character being defined according to an equation $$(nw * Y+A)+(nw \times a)+b$$

where A is equal to the integer portion of an equation (X/16), corresponding to the character's orthogonal coordinate value X divided by the number of bits in a word, such that the term (nw * Y+A) is a constant for the character, and wherein a varies from 0 to (a)-1 and b varies from 0 to (b)-1 during formation of a bit image for the character.

9. The character image generator according to claim 8 further including second means for forming said bit images on said bit map memory.

10. An apparatus for generating and storing character image data for a subsequent printing operation based on a succession of character data including for each character at least character code data and orthogonal character position data comprising:

a bit map memory means having a plurality of consecutively addressable memory locations for representing an image area;

means for providing character image data for each character based on said character code data;

means for generating a linear address for storing said character image data of each character in a predetermined memory location of said bit map memory, said linear address for each character being determined in accordance with a size of said image area, a printing resolution, the orthogonal character position data for each character, the width of each character, and the height of each character; and means for storing said character image data in said bit map memory in accordance with said means for generating.

11. The apparatus of claim 10 wherein the means for generating generates a linear address in accordance with a number of words nw corresponding to a number of dots representing one horizontal line in a width of said image area, an X,Y defining coordinate of each character, a width (b) of each character in word units, and a height (a) of each character in line units, said linear address being generated for each character according to the following equation:

$$(nw * Y+A)+(nw \times a)+b$$

where A is equal to the integer portion of quotient obtained by dividing the defining coordinate X by a number of bits in a word, such that the term (nw * Y+A) is a constant for each character, and wherein b varies from 0 to (b)-1 and a varies from (a)-1 to 0.

* * * * *